United States Patent [19]

Plaschkes

[11] Patent Number: 5,582,238

[45] Date of Patent: Dec. 10, 1996

[54] HEAT EXCHANGER

[75] Inventor: Michael Plaschkes, Kibbutz Magen, Israel

[73] Assignee: Plastic Magen, Kibbutz Magen, Israel

[21] Appl. No.: 417,811

[22] Filed: Apr. 6, 1995

[30] Foreign Application Priority Data

Apr. 10, 1994 [IL] Israel ............................. 109269

[51] Int. Cl.$^6$ .......................... F24D 19/00; F24D 3/16
[52] U.S. Cl. ..................... 165/56; 165/49; 165/46; 165/176; 165/171; 237/69
[58] Field of Search ............................. 165/49, 56, 46, 165/171, 176; 237/69

[56] References Cited

U.S. PATENT DOCUMENTS

| | | | |
|---|---|---|---|
| 2,878,651 | 3/1959 | Heinzelman | 165/56 |
| 4,176,654 | 12/1979 | Zinn et al. | 126/448 |
| 4,270,596 | 6/1981 | Zinn et al. | 165/46 |
| 4,354,546 | 10/1982 | Zinn | 165/49 |
| 5,097,893 | 3/1992 | Trimble | 165/56 |
| 5,111,875 | 5/1992 | Hammarstedt | 165/56 |

FOREIGN PATENT DOCUMENTS

| | | | |
|---|---|---|---|
| 378425 | 8/1985 | Austria . | |
| 501470 | 9/1992 | European Pat. Off. . | |
| 2610073 | 7/1988 | France . | |
| 2518116 | 11/1976 | Germany | 165/49 |
| 3234793 | 3/1984 | Germany | 165/56 |

*Primary Examiner*—John K. Ford
*Attorney, Agent, or Firm*—Schweitzer Cornman & Gross

[57] ABSTRACT

The invention provides a heat exchanger mat, comprising a twin-duct manifold having a duct member comprised of an inlet duct and an outlet duct, a tube-socket member fixedly and fluid-tightly attached to the duct member, and a return manifold having a deflector member and a tube-socket member fixedly and fluid-tightly attached to one another. The mat also includes a plurality of tubes for circulation of a heat-exchanging liquid medium, each tube fixedly and fluid-tightly joined at one of its ends to the tube-socket member of the twin-duct manifold and at the other one of its ends to the tube-socket member of the return manifold. One end of each odd-numbered one of the tubes communicates via at least one aperture with one of the twin ducts, and one end of each even-numbered one of the tubes communicates via at least one other aperture with the other one of the twin ducts, and the other ends of all of the tubes communicate with the return manifold.

8 Claims, 3 Drawing Sheets

HEAT EXCHANGER

The present invention relates to a heat exchanger, in particular to a modular heating and cooling mat for room and space climatization.

Such mats are known and consist of two tubular manifolds, an inlet manifold and an outlet manifold, between which extend a plurality of tubes, each fluid-tightly welded at its ends to these manifolds. As for practical reasons it is very important to have these two manifolds close together rather than spaced apart by the length of the tubes, the accepted practice is to fold the mats back on themselves, so that the manifolds are located adjacent to one another. This arrangement, however, has the very serious disadvantage in that because of the folding-back, the tubes may have only very small diameters (2.5–3 mm) as well as very thin walls (0.3–0.4 mm). Consequently, their flow cross-section is relatively very small, resulting in a substantial loss of head. Moreover, the area where the tubes are welded to the manifolds is very sensitive and subject to stress concentrations. Because of their pliability, the tubes do not lie flat on the floor or against ceiling elements and their thin walls are subject to pinholes.

It is thus one of the objects of the present invention to overcome the disadvantages of the prior art heating and cooling mats and to provide a mat that, while having the inlet and outlet manifolds side by side, does not necessitate the folding back of the tubes, which therefore can be of a much larger diameter that reduces head loss, and which tubes have wall thicknesses greater by a factor of 3 to 4. Furthermore, the mat has tubes which are not welded to the manifolds, but are joined to the latter by a special process known as "overmolding," which consists of an element of the manifolds being molded over the tubes.

According to the invention, these objects are achieved by providing a heat exchanger mat comprising a twin-duct manifold having a duct member comprised of an inlet duct and an outlet duct, and a tube-socket member fixedly and fluid-tightly attached to said duct member; a return manifold having a deflector member and a tube-socket member fixedly and fluid-tightly attached to one another; a plurality of tubes for circulation of a heat-exchanging liquid medium, each tube fixedly and fluid-tightly joined at one of its ends to the tube-socket member of said twin-duct manifold and at the other one of its ends to the tube-socket member of said return manifold; wherein one end of each odd-numbered one of said tubes communicates via at least one aperture with one of said twin ducts, and one end of each even-numbered one of said tubes communicates via at least one other aperture with the other one of said twin ducts, and wherein the other ends of all of said tubes communicate with said return manifold.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
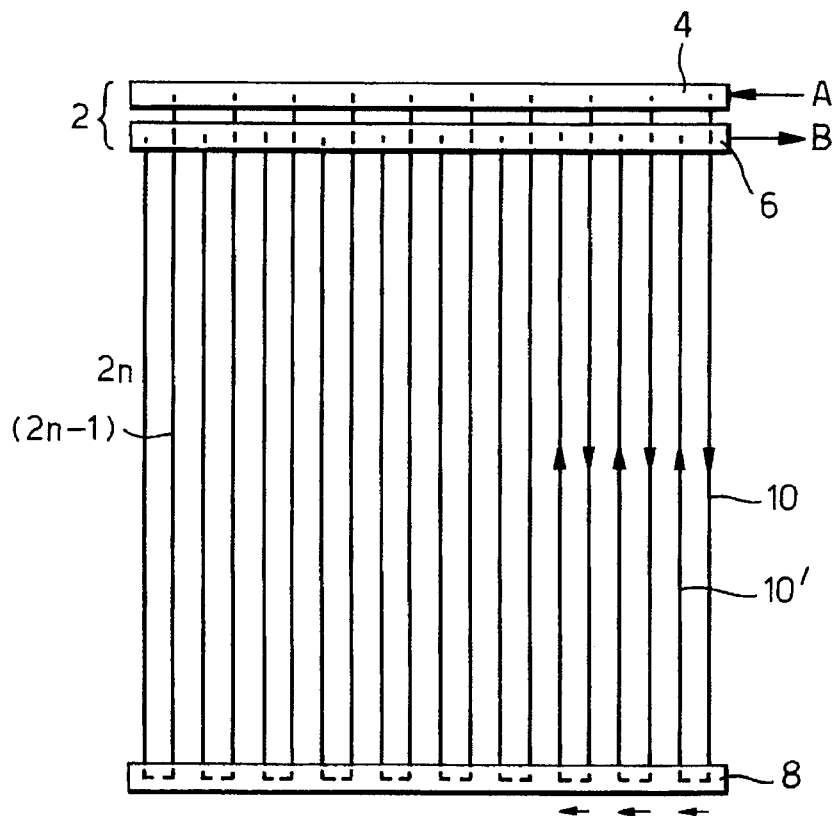
FIG. 1 is a schematic representation of the mat according to the invention.

Referring now to the drawings, there is seen in the schematic representation of FIG. 1 a twin-duct manifold 2 consisting of an inlet duct 4 and an outlet duct 6, which are represented here as two separate ducts, but are in reality an integral whole, as will be shown further below. Further seen is a return manifold 8 and a plurality of tubes 10, 10' (symbolized for clarity by a solid line), all of which components are made of a thermoplastic material such as, e.g., UV-resistant polypropylene. It is seen that all tubes 10, 10' originate in twin-duct manifold 2 and terminate in return manifold 8. More specifically, all odd-numbered tubes 10 communicate at one of their ends with inlet duct 4, while all even-numbered tubes 10' communicate at one of their ends with outlet duct 6. Both the odd-numbered and the even-numbered tubes communicate at their other ends with return manifold 8. Flow direction in the tubes 10, 10' is indicated by the arrow heads. The heated (or cooled) liquid medium enters inlet duct 4 in the direction of arrow A, passes along all odd-numbered tubes 10, enters the return manifold 8 and returns to the outlet duct 6 via the even-numbered tubes 10', leaving the outlet duct 6 in the direction of arrow B. This arrangement results in minimal "waviness" of the surface temperature of the mat, i.e., in a maximal uniformity of temperature distribution across the mat surface.

The actual design of the mat according to the invention is represented in FIGS. 2 to 9.

Figure 2:
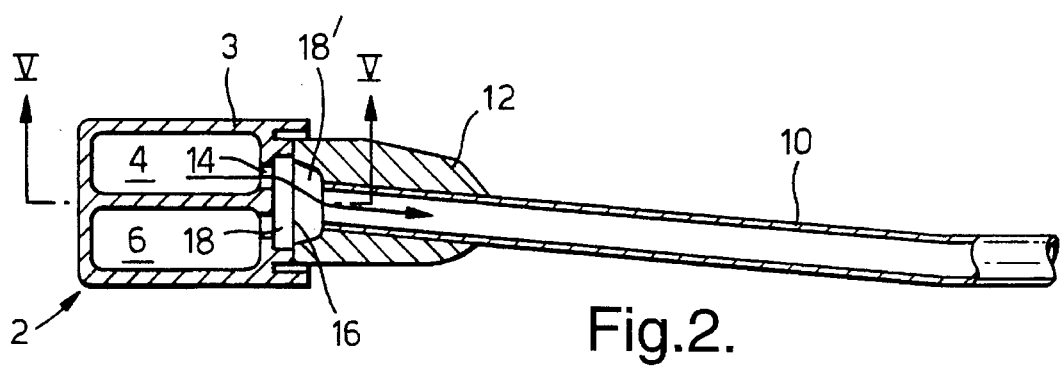
FIG. 2 is a cross-sectional view of the twin-duct manifold along a plane passing axially through any of the odd-numbered tubes 1, 3, 5 . . . (2n–1)

There is seen in FIG. 2 a twin-duct manifold 2 comprised of a duct member 3 accommodating an inlet duct 4 and an outlet duct 6, and a tube-socket member 12 in which are fixedly and fluid-tightly embedded the tubes 10, 10' forming the modular mat according to the invention.

Embedding is carried out by a special process in which the ends of tubes 10, 10' are clamped in proper spacing and alignment in the injection mold of tube-socket member 12, which is then injection-molded over the array of tubes 10, 10'. In this "overmolding" process, the prevailing heat and pressure cause the surfaces of these tube ends to fuse, thus producing an intimate and permanent bond between tubes 10, 10' and the solidifying tube-socket member 12.

After the overmolding stage, twin-duct member 2 and tube-socket member 12 are permanently joined, using one of the per-se known joining methods for thermoplastic components (infrared welding, hot-blade welding, etc.).

Figure 3:
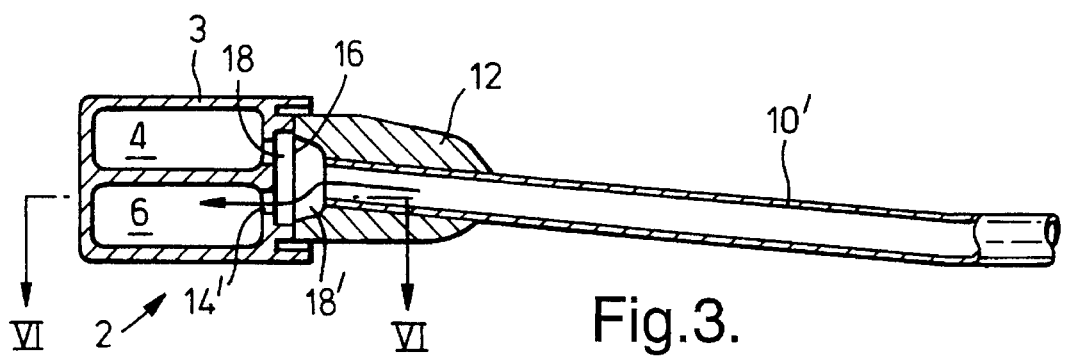
FIG. 3 is a cross-sectional view of the twin-duct manifold along a plane passing axially through any of the even-numbered tubes 2, 3, 6 . . . 2n.

FIG. 2 is a view in cross-section along a vertical plane passing through the axis of one of the odd-numbered tubes 10, while FIG. 3 is a cross-section along a vertical plane passing through the axis of one of the even-numbered tubes 10'. In FIG. 2, the liquid medium passes from the inlet duct 4 via a window-like aperture 14 into tube 10, while in FIG. 3 the liquid medium returns from tube 10' via a similar, but differently located aperture 14' into outlet duct 6.

Figure 4:
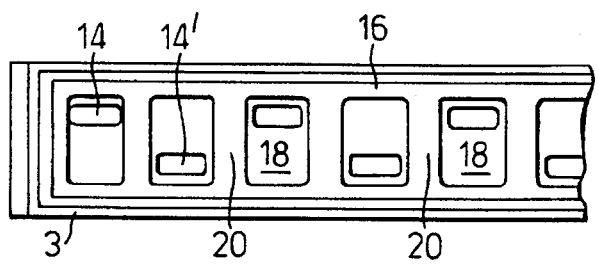
FIG. 4 shows the joining face of the twin-duct manifold.
Figure 5:
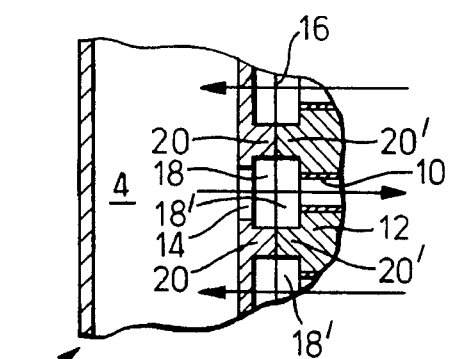
FIG. 5 is a view, in cross-section along plane V—V, of the twin-duct manifold of FIG. 2.
Figure 6:
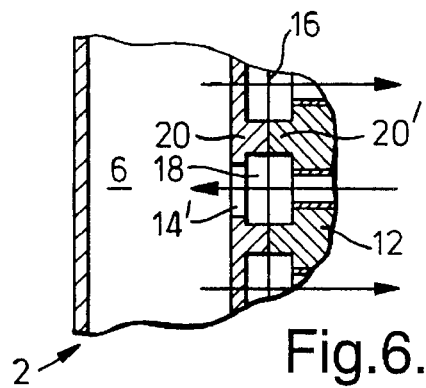
FIG. 6 is a view, in cross-section along plane VI—VI, of the twin-duct manifold of FIG. 3.

These apertures 14, 14', as well as other important features, are seen to better advantage in FIG. 4, which represents the joining face 16 of the duct member 3 of twin-duct manifold 2. Apertures 14, 14' are not located on the joining face 16, but at the bottom of rectangular recesses 18. This leaves between these recesses 18 partition walls 20 (see also FIGS. 5 and 6) which, in conjunction with similar walls 20' of tube-socket member 12, prevent the liquid medium that entered through aperture 14 from exiting immediately through the adjacent aperture 14' without passing through tubes 10 10' thereby "short-circuiting" the system. Tube-socket member 12 has similar recesses 18', registering with recesses 18 of duct member 3. The arrows in FIGS. 5 and 6 indicate directions of flow.

Figure 7:
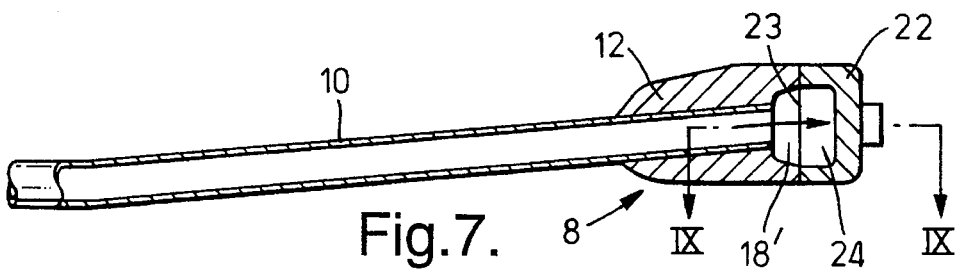
FIG. 7 is a cross-sectional view of the return manifold along a plane passing axially through any of the odd-numbered tubes 1, 3, 5 . . . (2n–1)
Figure 9:
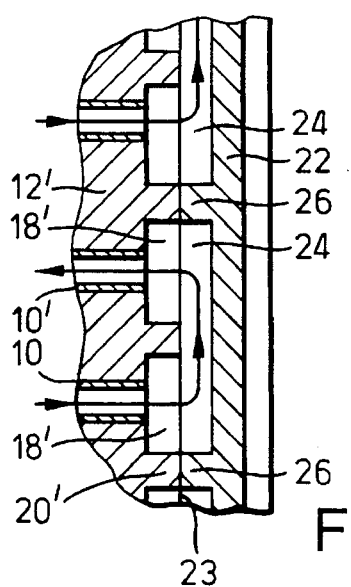
FIG. 9 is a view, in cross-section along plane IX—IX, of the return manifold of FIG. 7.
Figure 8:
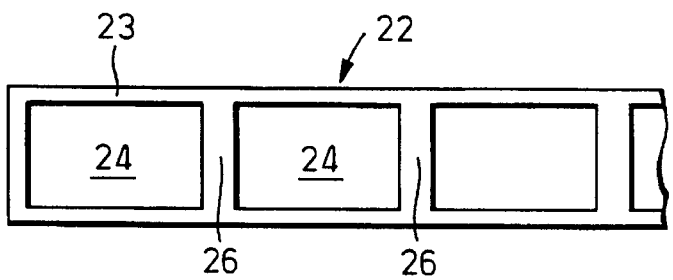
FIG. 8 shows the joining face of the deflector rail.

FIG. 7 is a view in cross-section along a vertical plane passing through the axis of one of the odd-numbered tubes 10. There is seen a tube-socket member 12 which is identical with tube-socket member 12 of twin-duct manifold 2, including recesses 18'. Welded to this tube-socket member 12 is seen a deflector rail 22, the joining face 23 of which is shown in FIG. 8 and which has a plurality of rectangular recesses 24 separated by partition walls 26. In the cross-sectional view of FIG. 9, these walls 26 are seen to register with every second wall 20' of tube-socket member 12, thus defining a flow path that deflects the flow from the odd-numbered tubes 10 into the even-numbered tubes 10', as indicated by the arrows in FIG. 9.

Figure 10:
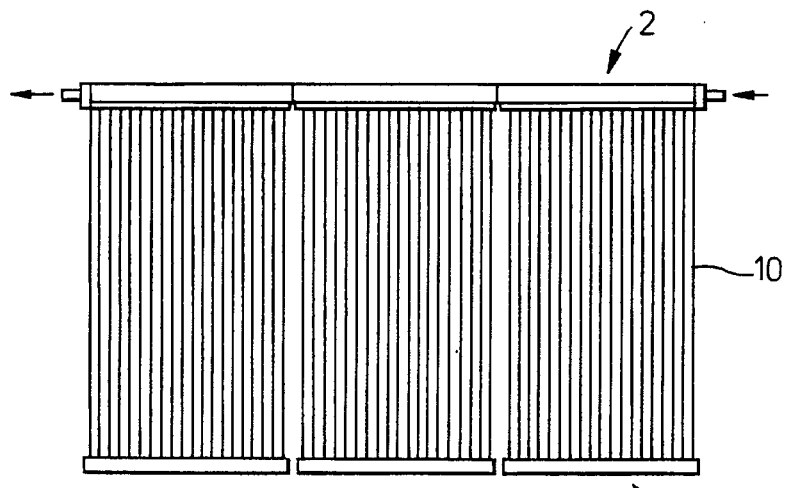
FIG. 10 illustrates a first example of a combination of several modular mats according to the invention.
Figure 11:
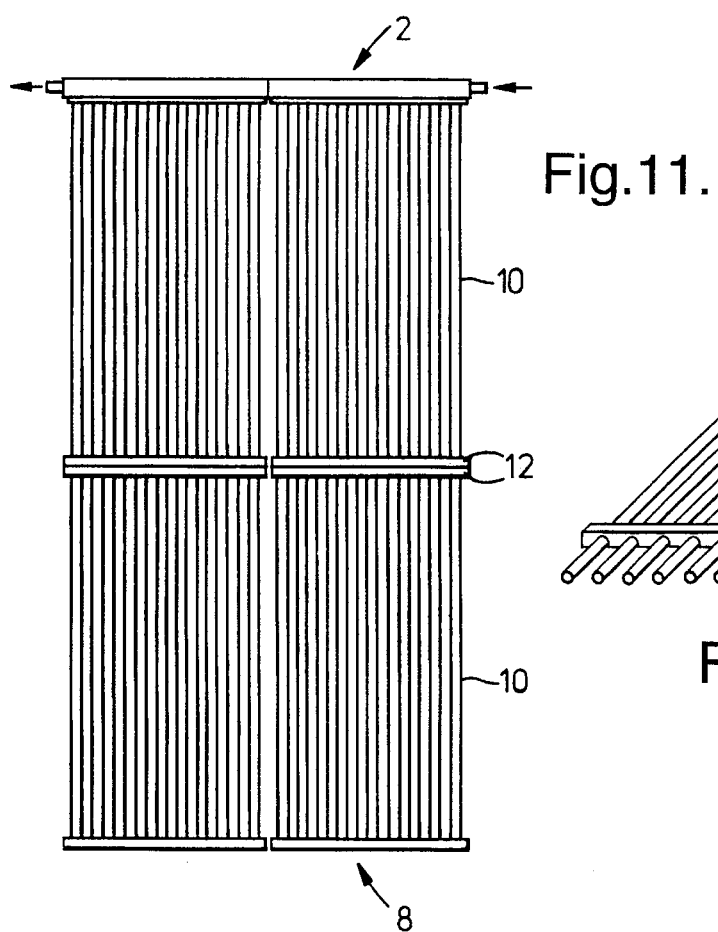
FIG. 11 represents a second such example.

FIGS. 10 and 11 represent different combinations of the modular mat according to the invention. In FIG. 10, three mats are laterally connected with their twin-duct manifolds 2, while in FIG. 11 each of two laterally connected mats is longitudinally connected with a further mat. This is achieved by welding together the lower tube-socket members 12 of the upper mats (without their deflector rails 22) and the upper tube-socket members 12 (without their duct members 3). The lowermost members of this combination are of course the return manifolds 8, consisting, as explained above, of the tube-socket members 12 and their respective deflector rails 22.

Figure 12:
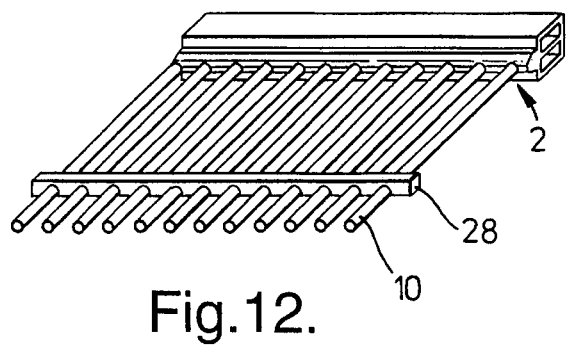
FIG. 12 is a perspective view of a part of a modular mat.

An important component of the modular mat according to the invention is a spacer rail 28 seen in FIG. 12, of which there may be more than one, depending on the length of tubes 10. Rail 28 snaps onto the tubes and maintains their mutual distance. Spacer rails 28 can also be used to attach the mats to walls, ceilings, etc.

Provision is also made for a variety of inlet and outlet connectors which optionally permit connection of the mat from both ends of the twin-duct manifold 2 ("In" on one end; "Out" on the other), as schematically shown in FIGS. 10 and 11. Connectors can also be arranged on one end only of manifold 2, one connector accessing the inlet duct 4; the other, outlet duct 6. Connectors can be parallel to the manifold axis, or perpendicular thereto.

While the width of the basic mat is obviously limited by the complex injection-molding dies required, this limitation is easily overcome by the combination of mats as illustrated in FIGS. 10 and 11.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A heat exchanger mat, comprising:

a twin-duct manifold having a duct member comprised of an inlet duct and an outlet duct, and a tube-socket member fixedly and fluid-tightly attached to said duct member;

a return manifold having a deflector member and a tube socket member fixedly and fluid-tightly attached to one another;

a plurality of tubes for circulation of a heat-exchanging liquid medium, each tube fixedly, fluid-tightly and in a co-planar relationship with each other joined at one of its ends to the tube-socket member of said twin-duct manifold and at the other one of its ends, in an equally co-planar relationship with each other to the tube-socket member of said return manifold;

wherein one end of each odd-numbered one of said tubes communicates via at least one aperture with one of said twin ducts, and one end of each even-numbered one of said tubes communicates via at least one other aperture with the other one of said twin ducts;

wherein the other ends of all of said tubes communicate with said return manifold, and wherein wall means are provided in said return manifold to permit said liquid medium from an odd-numbered tube to return to said twin-duct manifold only via an adjacent even-numbered tube.

2. The mat as claimed in claim 1, wherein the deflector member of said return manifold and its tube-socket member are joined by welding.

3. The mat as claimed in claim 1, wherein said tubes are disposed in a spaced-apart, substantially parallel and substantially planar arrangement.

4. The mat as claimed in claim 1, wherein said tubes are connected to said tube-socket members by overmolding.

5. The mat as claimed in claim 1, wherein the duct member of said twin-duct manifold and its tube socket member are joined by welding.

6. The mat as claimed in claim 1, wherein the deflector member of said return manifold and its tube-socket member are joined by welding.

7. The mat as claimed in claim 1, further comprising at least one spacer strip maintaining the distance between said tubes.

8. The mat as claimed in claim 1, wherein said inlet duct and said outlet duct are an integral whole.

\* \* \* \* \*